United States Patent

Michihira et al.

[11] Patent Number: 5,343,472
[45] Date of Patent: Aug. 30, 1994

[54] MULTIPLEX TRANSMISSION SYSTEM FOR USE IN VEHICLES

[75] Inventors: Osamu Michihira; Masao Hideshima; Akira Sone, all of Hiroshima, Japan

[73] Assignee: Mazda Motor Corporation, Hiroshima, Japan

[21] Appl. No.: 676,283

[22] Filed: Mar. 28, 1991

[30] Foreign Application Priority Data

Mar. 30, 1990 [JP] Japan .................. 2-81411

[51] Int. Cl.$^5$ .................. H04J 3/02; H04J 3/16
[52] U.S. Cl. .................. 370/85.6; 370/85.7; 370/85.13; 370/85.15; 370/95.1; 370/95.3
[58] Field of Search .................. 370/85.2, 85.3, 85.6, 370/85.13, 85.7, 95.1, 95.3, 94.2, 60.1, 85.1, 85.15; 340/825.5, 825.51, 825.05

[56] References Cited

U.S. PATENT DOCUMENTS

| | | | |
|---|---|---|---|
| 4,581,734 | 4/1986 | Olson et al. | 370/85.6 |
| 4,733,390 | 3/1988 | Shirakawa et al. | 370/85.6 |
| 4,763,320 | 8/1988 | Rudolph et al. | 370/85.7 |
| 4,791,629 | 12/1988 | Burns et al. | 370/85.13 |
| 4,907,222 | 3/1990 | Slavik | 370/85.7 |
| 4,942,571 | 7/1990 | Moller et al. | 370/85.13 |
| 4,990,907 | 2/1991 | Jikihara et al. | 370/85.6 |
| 5,012,469 | 4/1991 | Sardana | 370/95.3 |
| 5,077,733 | 12/1991 | Whipple | 370/85.6 |
| 5,079,759 | 1/1992 | Kajiyama | 370/13 |
| 5,090,012 | 2/1992 | Kajiyama | 370/85.3 |
| 5,168,271 | 12/1992 | Hoff | 370/95.1 |
| 5,193,091 | 3/1993 | Crisler et al. | 370/95.1 |
| 5,197,125 | 3/1993 | Engel et al. | 370/95.3 |

FOREIGN PATENT DOCUMENTS 64-36541  2/1964  Japan .
62-4658   1/1987  Japan .

Primary Examiner—Stephen Chin
Assistant Examiner—Vijay Shankar

[57] ABSTRACT

In a multiplex transmission system for vehicles, the right to access a bus is divided into a plurality of main time slots, and the individual time slots are subdivided into two subordinate time slots. In each individual main time slot, a communication node having comparatively heavy traffic is assigned to a first of the two subordinate time slots, and a communication node having comparatively light traffic is assigned to a second of the two subordinate time slots.

15 Claims, 9 Drawing Sheets

| PHASE \ NODE | TRC | EGI | 4WS | BODY |
|---|---|---|---|---|
| 0 | ○ | ○ | ○ | ○ |
| 1 | ○ | ○ | | |
| 2 | ○ | | ○ | |
| 3 | ○ | | | |

FIG. 6

MULTIPLEX TRANSMISSION SYSTEM FOR USE IN VEHICLES

BACKGROUND OF THE INVENTION

This invention relates to a multiplex transmission system for vehicles, in which multiplex transmission such as of the CSMA/CD type is applied to the transmission of signals in an automotive vehicle. More particularly, the invention relates to optimization of transmission efficiency in a network system in which communication nodes are mixed, namely high-speed communication nodes for controllers [such as an ABS (antilock braking system) controller or TRC (traction control) controller] that require high-speed data communication, and low-speed communication nodes for electrical accessories associated with the vehicle body or so-called "body system".

The greater use of electronics in automotive vehicles has been accompanied by a number of serious problems, among which are the increased size and complexity of the wire harnesses that interconnect the electronic components. Multiplex communication has come to the fore as a means of solving these problems, particularly in the automobile field. Multiplex communication refers to a transmission, by time-division multiplexing, of plural items of data on a single wire harness, and basically employs serial transmission.

In the field of automobiles, multiplex communication networks may be considered as being divided into either of two classes, one class being complete multiplex- and partial multiplex-type networks, and the other being centralized- and decentralized-type networks.

The partial multiplex-type network mixes a non-multiplex communication portion and a multiplex communication portion. In the multiplex communication portion, switches and loads decentralized in terms of distances are connected by a multiplex transmission unit. Since separate wiring is required between the multiplex transmission unit and the switches and loads, a drawback is that the numbers of wires is greater, although the overall length of the interconnecting wiring is reduced.

The centralized-type network is one in which a plurality of slave transmission units are connected to a single master transmission unit. With a network having this configuration, a smaller harness diameter is achieved but the entire system is rendered inoperative if the master transmission unit fails. Another shortcoming is that difficulties are encountered in design modification. On the other hand, the decentralized network, though higher in cost, exhibits a number of advantages, such as a much smaller harness diameter, high reliability with regard to partial failure and greater flexibility in terms of design modification. For an example of the latter, see Japanese Patent Application Laid-Open Publication No. 62-4658.

With regard to this decentralized multiplex communication system, a CSMA/CD system is employed in accordance with an SAE (Society of Automotive Engineers) standardization proposal.

The assignee of this invention has also proposed a PALMNET (protocol for automotive local area network) system which is a further development upon this CSMA/CD system. For example, see Japanese Patent Application Publication No. 62-302421.

Further, as described in Japanese Patent Application Laid-Open (KOKAI) Publication No. 64-36541 belonging to the assignee of this invention, a master node transmits a reference pulse for time sharing the right to access a bus in order to set a channel on a transmission line.

In such a decentralized multiplex transmission system for vehicles, there are instances where communication speed is a problem. With the conventional decentralized multiplex transmission system for vehicles, no difficulties are encountered if the only data to be transmitted is that relating to simple switches and solenoids. A node for handling such low-speed accessories is referred to as a low-speed node.

However, when it is attempted to apply multiplex communication to high-speed controllers such as an engine controller, active suspension controller or traction controller, information required by these controllers is generated very frequently, and therefore communication speed becomes a problem. Nodes for handling such high-speed controllers are referred to as high-speed nodes.

In a case where a network having a low communication speed is used, there are instances where the low communication speed cannot keep up with the high speed of the controllers. In such instances, there is a high probability that the network bus will be busy, and therefore the high-speed controllers may be denied access to the bus. As a consequence, there is the danger that a delay will develop in control. When it is attempted to raise communication speed, a high-speed communication LSI is required and difficulties are encountered in terms of cost. Accordingly, when multiplex communication is applied to high-speed controllers, problems arise in respect of balancing cost and control speed.

SUMMARY OF THE INVENTION

Accordingly, an object of the present invention is to provide a multiplex transmission system for vehicles in which, in a vehicular multiplex communication network wherein high-speed nodes and low-speed nodes are mixed, even a comparatively low-speed transmission line can be used while minimizing the influence on access to a bus by the high-speed nodes, thereby making it possible to mix use of a low-speed transmission line and high-speed nodes.

According to the present invention, the foregoing object is attained by providing a multiplex transmission system for a vehicle comprising a shared multiplex transmission line, and a plurality of communication nodes of a first group and a second group interconnected via the transmission line, the system comprising:

time-dividing means for dividing time during which the plurality of communication nodes are capable of accessing the transmission line into a plurality of main time slots; and prohibiting means for prohibiting all communication nodes of the first group from accessing the transmission line in at least one main time slot among the plurality of main time slots.

In the system constructed as described above, assume that the nodes of the first group are low-speed (light-traffic) nodes and that the nodes of the second group are high-speed (heavy-traffic) nodes. According to the invention, the probability that the high-speed nodes of the second group will have to await access is reduced. Since the nodes of the first group are low-speed nodes, no problem arises if these nodes are kept waiting for access.

In a preferred embodiment of the invention, those communication nodes in the second group that have the heaviest traffic serve also as time-dividing means.

In a preferred embodiment of the invention, a frame with identification information which identifies the main time slots is transmitted on the transmission line.

In a preferred embodiment of the invention, each of the main time slots is subdivided into a plurality of subordinate time slots preferably two.

In a preferred embodiment of the invention, a first time slot of the two subordinate time slots is assigned to a specific communication node in order that this specific communication node may access the transmission line.

In a preferred embodiment of the invention, main time slots other than the at least one main time slot are assigned to a second communication node other than the specific communication node, with the number of these other main time slots assigned being greater the higher the order of priority of access of the second communication node to the transmission line.

According to another aspect of the present invention, the foregoing object is attained by providing a multiplex transmission system for a vehicle comprising a shared multiplex transmission line, and a plurality of communication nodes interconnected via the transmission line, the system comprising:

time-dividing means for dividing time during which the plurality of communication nodes are capable of accessing the transmission line into a plurality of main time slots; and assigning means for assigning a greater number of main time slots the higher the order of priority of access of the plurality of communication nodes to the transmission line.

In the system thus constructed, the right of access is time-shared and the higher the order of priority of a node, the greater the number of time slots allotted to that node. Therefore, a node with a high order of priority seldom is kept waiting for access, and it is possible to reduce the communication speed of the overall network by an amount equivalent to the narrowing in the right of access of communication nodes having a low order of priority.

According to yet another aspect of the present invention, the foregoing object is attained by providing a multiplex transmission system for a vehicle comprising a shared multiplex transmission line, and a plurality of communication nodes of a first group and a second group interconnected via the transmission line, the system comprising:

time-dividing means for dividing time during which the plurality of communication nodes are capable of accessing the transmission line into a plurality of main time slots, and subdividing individual ones of the main time slots into two subordinate time slots; and assigning means for assigning one subordinate time slot of the two subordinate time slots to the plurality of communication nodes of the first group and assigning the other subordinate time slot of the two subordinate time slots to the plurality of communication nodes of the second group.

In the system thus constructed, the right of access is partitioned into main time slots, and the individual main time slots are further divided into two subordinate time slots. The nodes of the first group, e.g., nodes having a high order of priority, are allotted to the first subordinate time slot of the two subordinate time slots, and the nodes of the second group, e.g., nodes having a low order of priority, are allotted to the second subordinate time slot of the two subordinate time slots. As a result, only communication nodes having a closely resembling communication function are grouped together and allotted to each of the two subordinate time slots. This makes possible efficient operation of the network.

In a preferred embodiment of the invention, the communication nodes perform communication by a contention method in the subordinate time slots.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a diagram illustrating an example of a method of allotting access to nodes in each phase;

DESCRIPTION OF THE PREFERRED EMBODIMENT

Reference will be had to the accompanying drawings to describe an embodiment in which the present invention is applied to a multiplex communication apparatus for an automobile employing the aforementioned PALMNET system.

Figure 1:
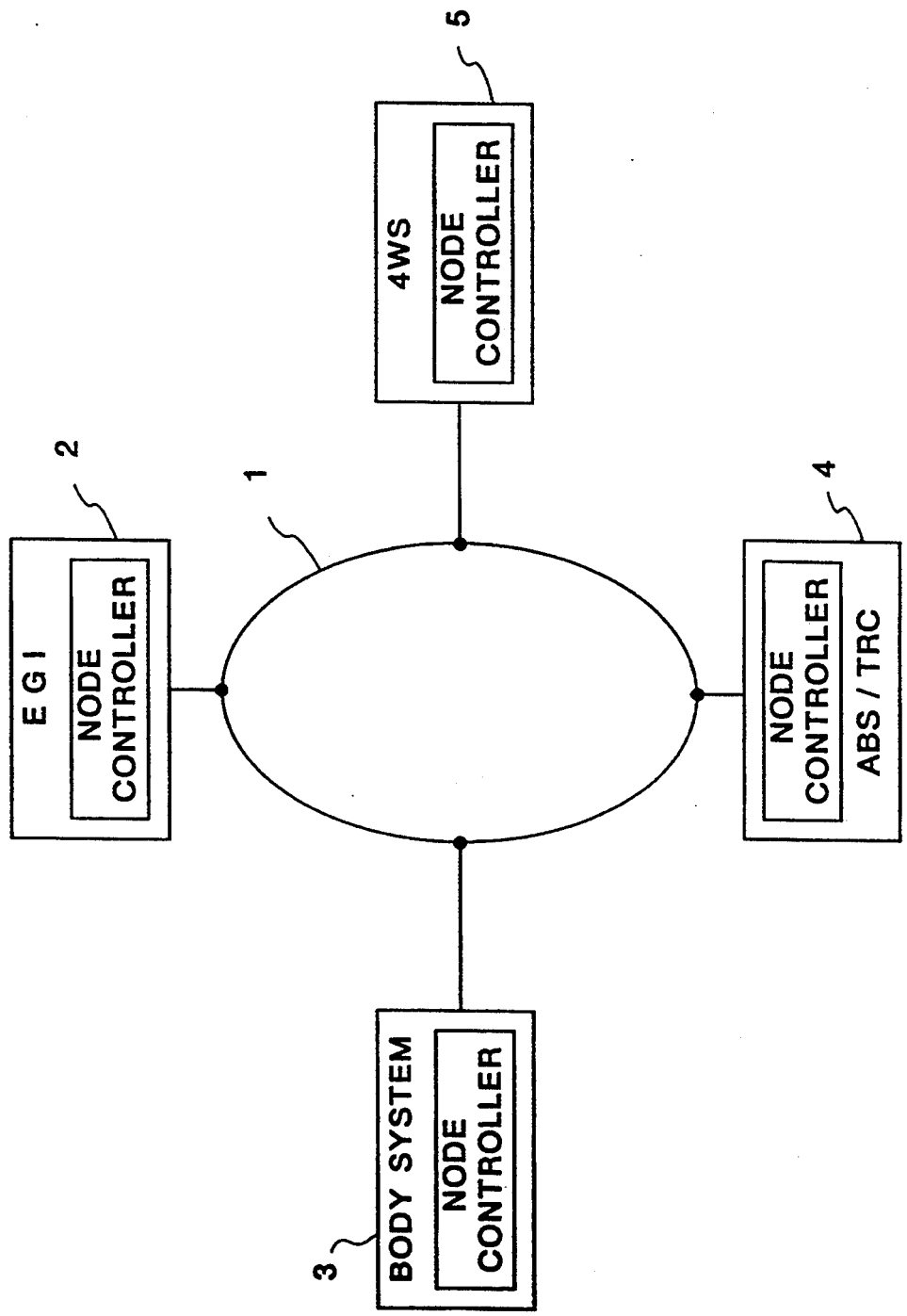
FIG. 1 is a diagram for describing the network of a multiplex transmission system according to an embodiment of the present invention.

FIG. 1 illustrates the construction of an embodiment of the present invention, in which only four nodes are shown in order to simplify the description. Numeral 1 denotes a transmission line in which use is made of a pair of twisted wires. The communication speed is 20 kbps. This embodiment is characterized in that communication is possible without keeping the four nodes waiting for access even at the low communication speed mentioned above. The four nodes include three high-speed communication nodes and one low-speed communication node. In this embodiment, examples of the high-speed communication nodes are an ABS/TRC communication node 4 having a controller (anti-lock brake/traction controller) for performing slip control in order to prevent locking of brakes, an EGI communication node 2 having an EGI controller for controlling the engine, and a 4 WS communication node 5 having a controller for four-wheel steering (i.e., rear-wheel steering). An example of the low-speed node is a body-system communication node 3 having a controller for controlling switches associated with the vehicle body. It goes without saying that various communication nodes in addition to the foregoing nodes can be incorporated within the system.

Figure 5:
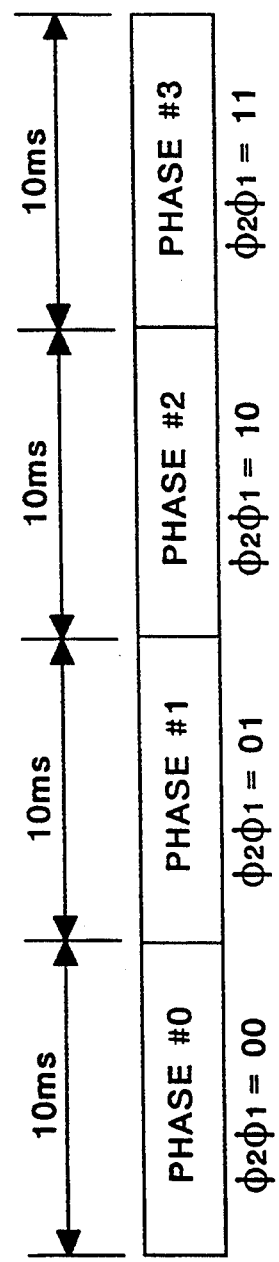
FIG. 5 is a diagram illustrating the arrangement of phases in this embodiment.
Figure 7:
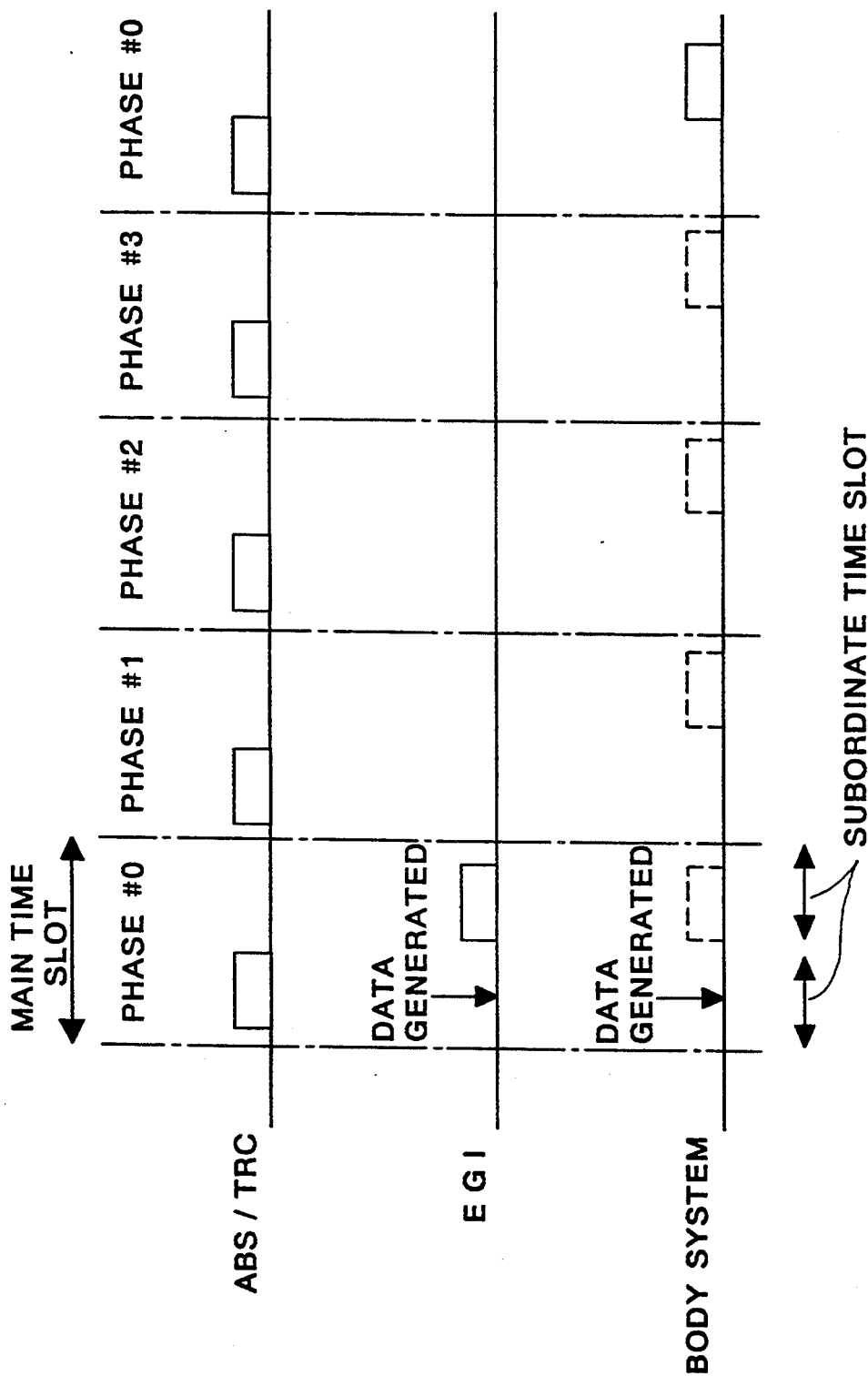
FIG. 7 is a timing chart for describing the state of data contention between nodes.

In the communication system of this embodiment,
(1) the right of access to the transmission line 1 is divided into a plurality of main time slots, as shown in FIG. 5, and
(2) the individual main time slots are subdivided into two subordinate time slots, as shown in FIG. 7.

Figure 2:
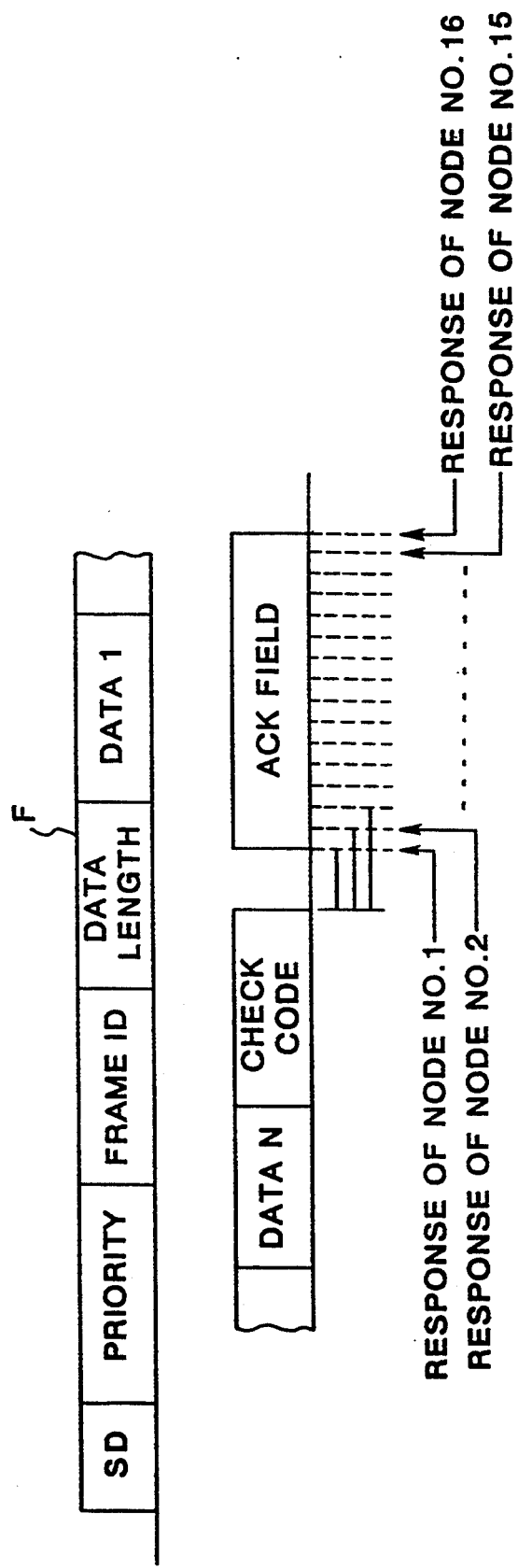
FIG. 2 is a diagram illustrating the format of a frame used in the embodiment of the present invention.

In the multiplex transmission system for automobiles of the present embodiment, automobile operating information is transmitted every frame F, which has the configuration shown in FIG. 2.

The frame F has an SD (start delimiter) code, a priority code, a frame ID code, a data length, data 1 through N, and a check code.

The "SD code" is a specific code representing the start of the frame F. When a communication node receives the SD code, it recognizes the start of the frame F. The "priority code" indicates order of priority, which designates which signal (i.e., which node) is to be given priority for processing when a plurality of multiplex communication nodes transmit data simultaneously so that the signals collide on the bus 1. In this embodiment, priority is such that the lower the bit value, the higher the order of priority. The reason is that the logic level is achieved by a wired-OR on bus 1. If signals are transmitted by a plurality of communication nodes at the same time, the "priority codes" of communication nodes having high orders of priority remain on bus 1. Therefore, communication nodes having low orders of priority detect collision since the priority codes transmitted by these nodes change to other codes. These nodes of low priority delay re-transmission of their own failed frames, as a result of which re-transmission from nodes of high priority takes precedence.

The "frame ID code" identifies the destination of transmission of the particular frame. As for "data length", the number of bytes of data is written following this. If these items of data are N in number, then N will be transmitted as the data length. At a communication node which has received this frame, only the content of this data length is read. The field which immediately follows this data is a CRC check code (error detection code). End of the frame can be determined by recognizing this code. It should be noted that the format of FIG. 2 illustrates a general format; the data length of frames used in this embodiment is standardized at four bytes.

Figure 3:
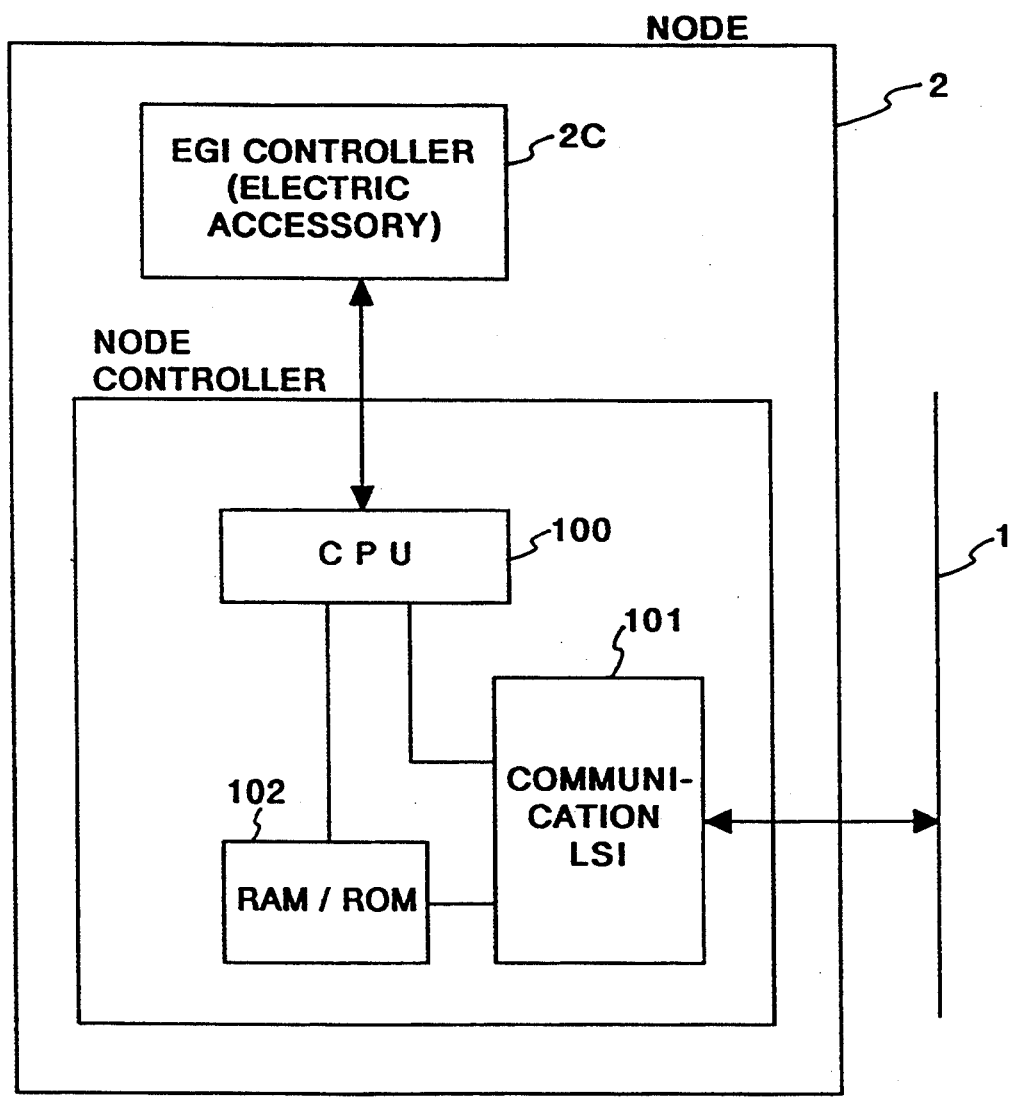
FIG. 3 is a block diagram illustrating the construction of a node, in which an EGI node is taken as an example.

FIG. 3 is a diagram illustrating the construction of a communication node 2 taking an EGI controller 2c for engine control as an example. As shown in FIG. 3, each node comprises an electrical accessory such as the EGI controller 2c, and a node controller. Each node of the control-system network is connected to the transmission line 1 via a communication LSI 101. A CPU 100 is for controlling the LSI 101 and operates in accordance with programs stored in a RAM/ROM 102. Protocol control of the physical layer level of the CSMA/CD system is carried out by the LSI 101. The CPU 100 controls the LSI 101, processes the data from the LSI 101 and delivers the results of processing to the EGI controller 2c. Alternatively, the CPU 100 performs control for delivering data from the EGI controller 2c to the LSI 101. More specifically, for the sake of the controller devoted to engine control, the CPU 100 converts the frame data on the bus into a format capable of being used by the EGI controller 2c and converts data from the EGI controller 2c into the frame format.

In the system of FIG. 1, the right of access to the transmission line 1 is assigned by being divided into four main time slots (phases 0 through 3). More specifically, one channel is allotted to one main time slot 1. In order to carry out channel management, the ABS/TRC communication node performs the function of notifying the other communication nodes of which channel has been set on the bus 1, namely which phase has been allotted. This ABS/TRC communication node transmits, on bus 1, the frame which indicates the phase presently set on the bus.

Figure 4:
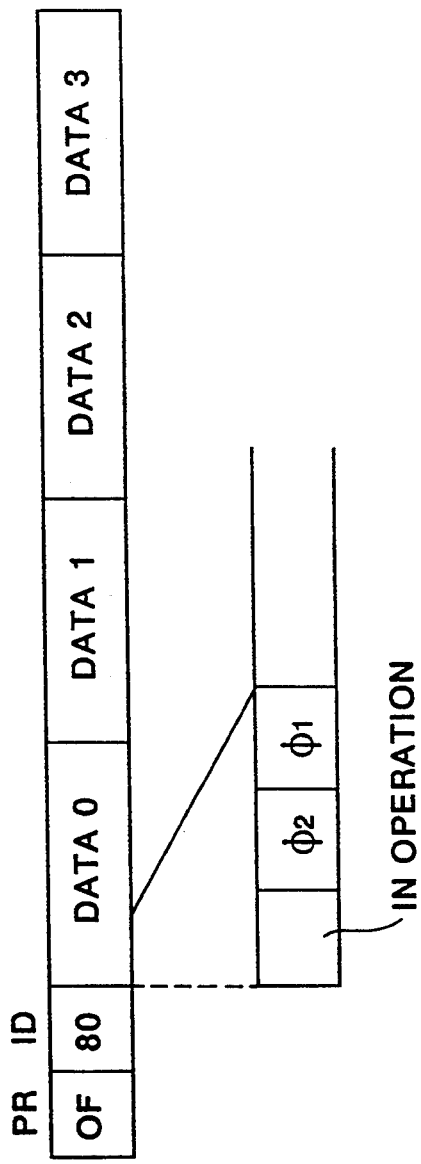
FIG. 4 is a diagram illustrating the format of a frame assigned to an ABS/TRC node.

In this embodiment, the data length is four bytes (=32 bits). FIG. 4 illustrates the format of the frame of the ABS/TRC communication node. As shown in FIG. 4, the priority of the ABS/TRC communication node is "0F", and the ID thereof is "80". The first three bits of the initial data (DATA0) will be described. The initial bit indicates whether the ABS/TRC controller is operating or not. The next two bits, namely $\phi_2$ and $\phi_1$, are used in order to carry out the above-mentioned channel setting.

FIG. 5 illustrates the relationship between the four phases and the $\phi_2$ and $\phi_1$ bits. Specifically, we have $\phi_2, \phi_1 = 0, 0 \rightarrow$ phase 0
$\phi_2, \phi_1 = 0, 1 \rightarrow$ phase 1
$\phi_2, \phi_1 = 1, 0 \rightarrow$ phase 2
$\phi_2, \phi_1 = 1, 1 \rightarrow$ phase 3

The length of each phase is a nominal 10 ms. In this embodiment, the ABS/TRC communication node is what permits the function for setting these channels, namely the function for transmitting the $\phi_2$, $\phi_1$ bits. That is, the ABS/TRC communication node sets the channel by transmitting the frame having the format of FIG. 4 on the bus 1 every 10 ms. In addition, if the ABS/TRC communication node itself possesses data that is to be transmitted, then this node places this data inside the frame. In other words, the ABS/TRC communication node 4 always has the right to access the bus 1.

Figure 6:
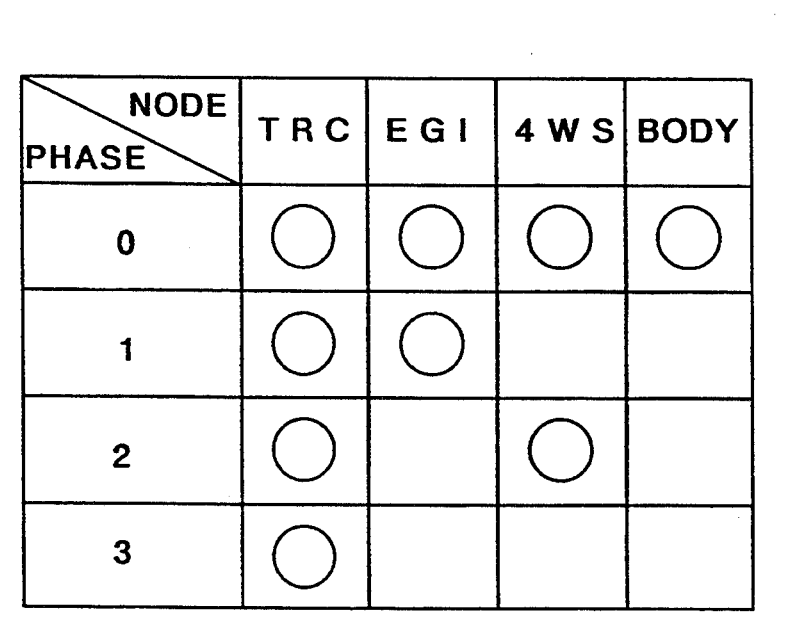

FIG. 6 illustrates which phase access rights are allotted to the four communication nodes. As mentioned above, the ABS/TRC communication node is allowed an access right in all of the phases, as illustrated in FIG. 6. The EGI communication node is allowed an access right in phases 0 and 1, and the 4WS communication node is allowed an access right is phases 0 and 2. The ABS/TRC communication node, EGI communication node and 4 WS communication node are high-speed communication nodes. According to the assignments shown in FIG. 6, all communication nodes are allowed access in phase 0, the ABS/TRC communication node and EGI communication node in phase 1, the ABS/TRC communication node and 4 WS communication node in phase 2, and only the ABS/TRC communication node in phase 3. If a new high-speed communication node is added, the main time slots of phases 0 and 3 would be assigned to it.

In the assignments shown in FIG. 6, all of the communication nodes are allowed access in phase 0. In other words, only phase 0 is allotted to the body-system communication node. Since all of the communication nodes have the right of access in phase 0, the possibility that a clash will occur in terms of access is high. However, since all phases are allowed with regard to the ABS/TRC communication node and one other phase in addition to the phase 0 is allowed for the other high-speed communication nodes, transmission of the data is assured without keeping the high-speed communication nodes inclusive of the ABS/TRC communication node waiting for a long period of time. In other words, there is a very high possibility that the body-system communication node will be kept waiting a long time for access. However, since this body-system communication node is a low-speed communication node (i.e., one in which data is generated only infrequently), the node is not kept waiting for long until access is granted. Thus, no problems arise.

The manner in which a node is kept waiting before it can access the bus will be described in detail with reference to FIG. 7. As illustrated in FIG. 7, each phase is subdivided into two subordinate time slots. The first of the two subordinate time slots in each phase is allotted solely to the ABS/TRC communication node. In the time period of this first subordinate time slot, the ABS/TRC communication node transmits its own data along with the channel setting bits ($\phi_2$, $\phi_1$). The communication nodes other than the ABS/TRC communication node transmit their own data in the second of the two subordinate time slots. The reason why the ABS/TRC communication node transmits in the first subordinate time slot and the other communication nodes transmit in the second subordinate time slot is that the communication nodes other than the ABS/TRC communication node determine whether the timing is right for them to transmit their own data, this determination being made by observing the channel setting bits of the frame transmitted by the ABS/TRC communication node.

In the initial phase 0 of FIG. 7, it is assumed that transmission data are generated substantially simultaneously by the EGI communication node and body-system communication node. However, since the right of access is not acknowledged for the body-system communication node in phase 0, the EGI communication node makes a transmission and the body-system communication node is made to wait in this phase. Next, in the phases from 1 through 3, the body-system communication node is not granted the right of access and therefore is kept waiting until phase 0. If there is no access from the other high-speed communication nodes in the next phase 0, then right of access of the body-system communication node, kept waiting until now, is granted at this time.

Figure 8:
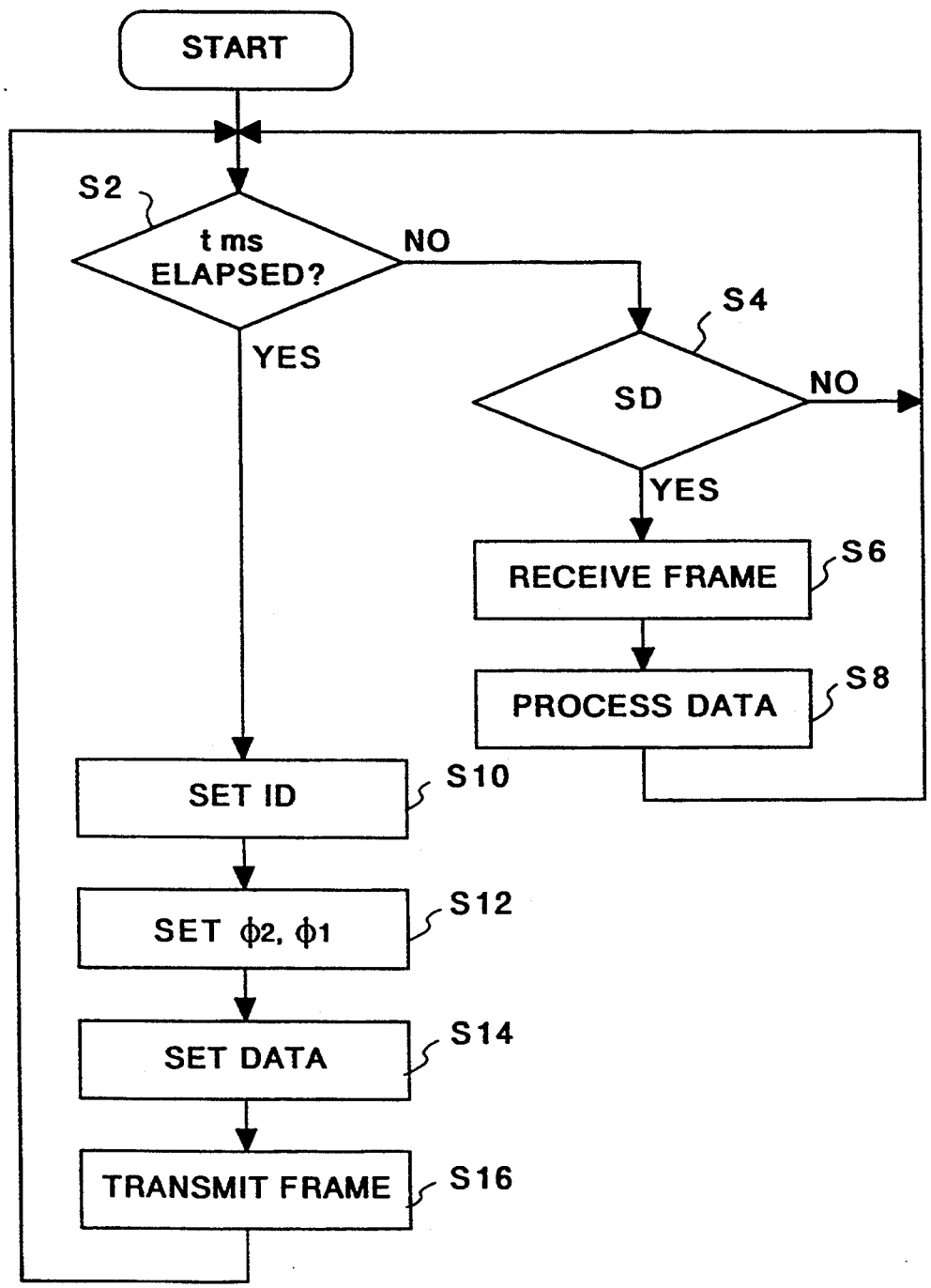
FIGS. 8 through 10 are flowcharts illustrating control procedures in the nodes of the system according to this embodiment.
Figure 9:
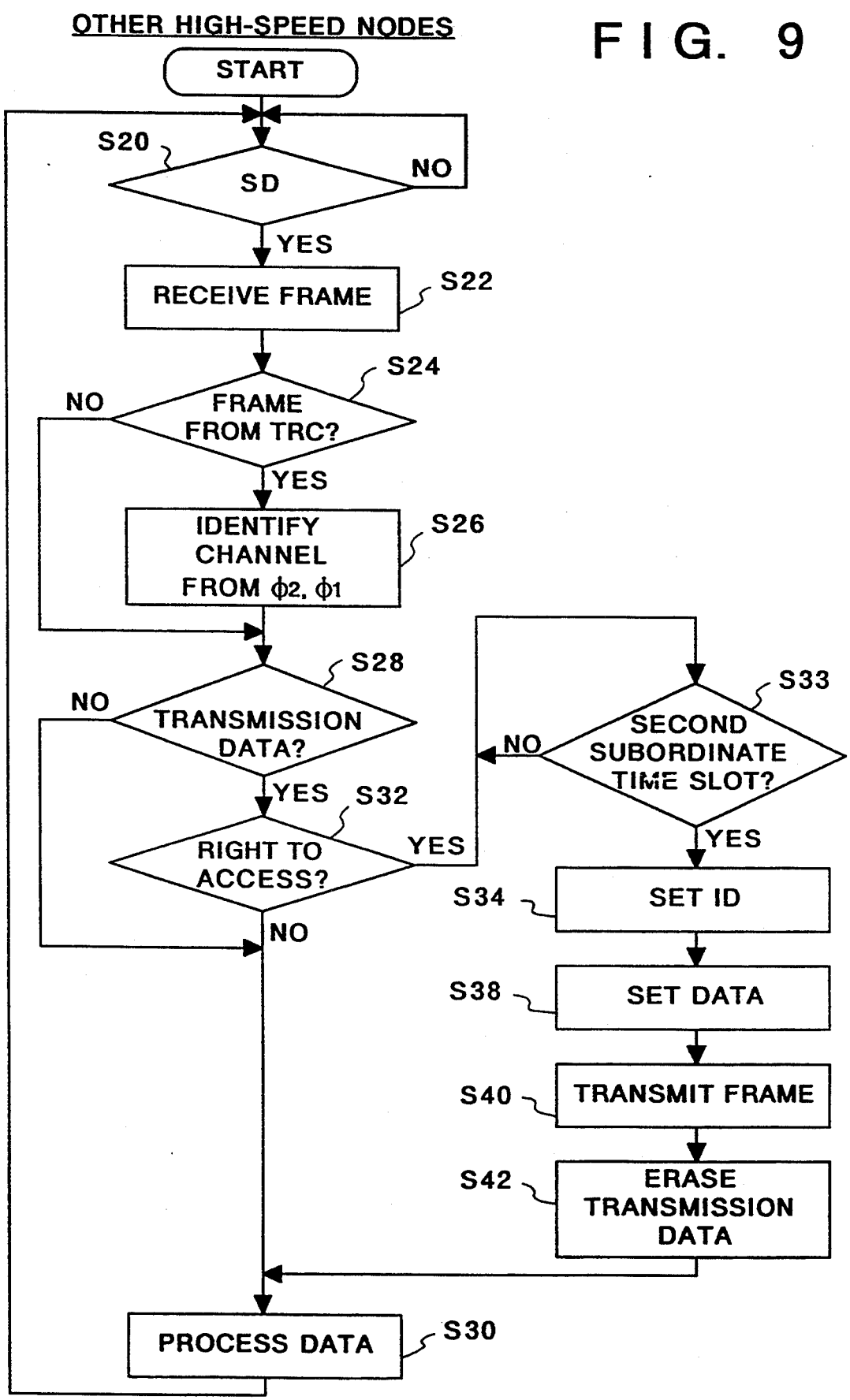
Figure 10:
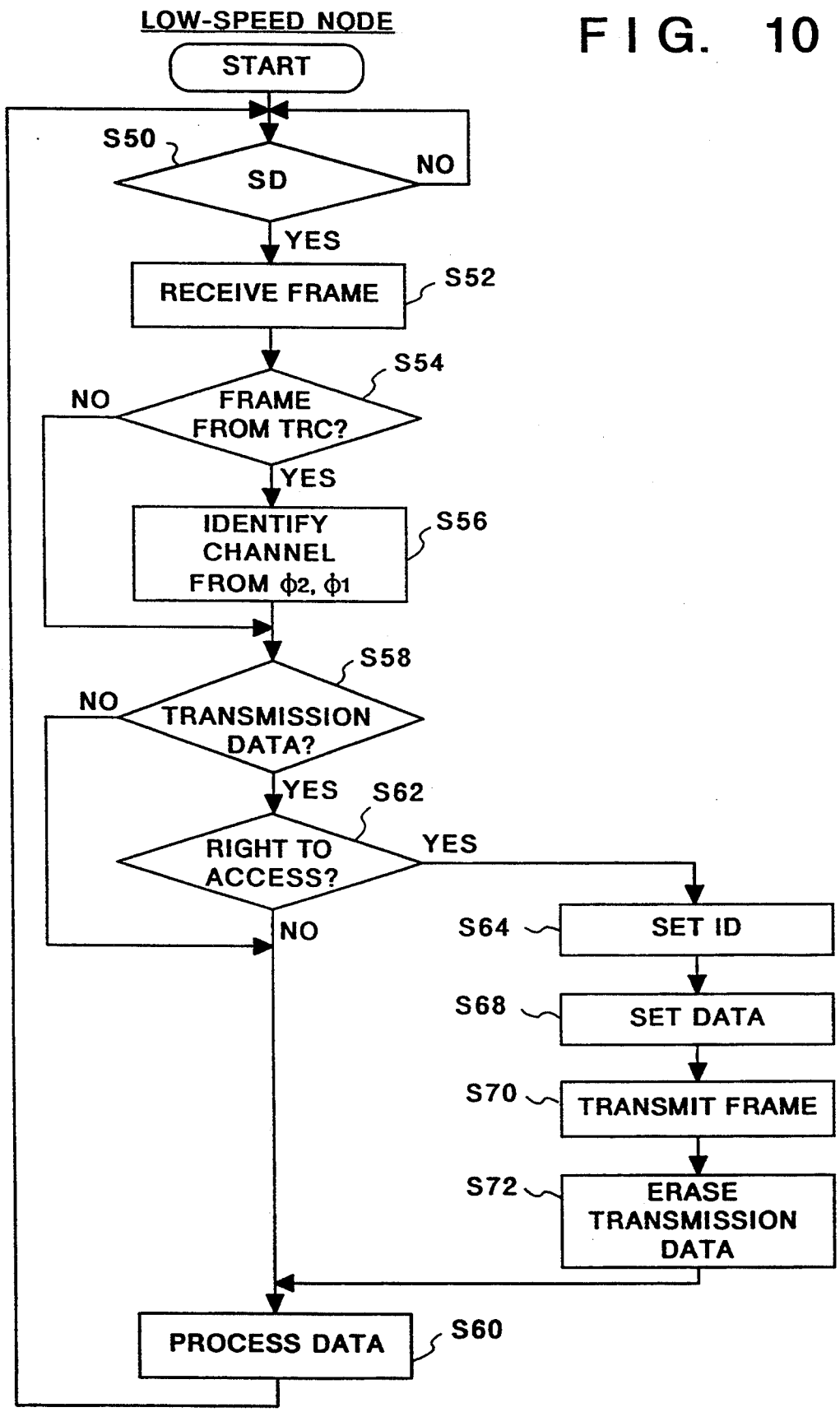

FIG. 8 is a flowchart illustrating the control procedure in the ABS/TRC communication node; FIG. 9 is a flowchart illustrating the control procedure in high-speed communication nodes other than the ABS/TRC communication node; FIG. 10 is a flowchart illustrating the control procedure in the body-system communication node, which is a low-speed communication node.

The control procedure of the ABS/TRC communication node will be described first. Step S2 calls for the system to wait for a time of t ms. This period of time is the result of subtracting the time required for the ABS/TRC communication node to transmit its own frame from the duration, namely 10 ms, of one phase (one main time slot). In other words, it is determined at step S2 whether the present point in time corresponds to the timing of the first subordinate time slot of a main time slot. Before elapse of this time, the program proceeds to step S4, at which it is determined whether there is an SD, which signifies receipt of a frame from another communication node. If an SD is detected prior to elapse of t ms, this frame is received in step S6 and the data directed to this node itself (directed to the ABS/TRC node itself), which data is contained in this frame, is processed in step S8. For example, if there is a frame from the EGI communication node, then data such as engine rpm which the ABS/TRC communication node uses in traction control would be contained in this frame.

When the time t ms elapses, the frame of the ABS/TRC node is created and transmitted from step S10 onward. Specifically, an ID representing the ABS/TRC communication node is prepared in the ID field (FIG. 4) at step S10, and the channel setting bits are prepared at step S12. As shown in FIG. 5, these bits have any of the following values: 00, 01, 10, 11. The values change in the following order: 00→01→10→11. The data directed to other communication nodes is prepared at step S14. The prepared frame is transmitted at step S16.

FIG. 9 shows the control procedure of a high-speed communication node other than the ABS/TRC communication node. The system waits for receipt of the frame from the other communication node at step S20. When the frame is received in step S22, the ID in the frame is examined at step S24 to determine whether it is indicative of ABS/TRC. In a case where the frame is not from the ABS/TRC communication node, the program proceeds to step S28. In a case where the frame is from the ABS/TRC communication node, the present phase is identified in step S26 based upon the channel setting bits contained in this frame.

Next, it is determined at step S28 whether the node itself possesses data to be transmitted. If there is no data to be transmitted, the program proceeds to step S30, where the data in the frame received at step S22 is processed. If there is data to be transmitted, it is determined at step S32 whether the node itself is allowed the right of access in the present phase. If the phase is one in which the right of access is not allowed, the program proceeds to step S30. If the present phase recognized at step S26 is one in which the node itself is allowed access, the system waits at step S33 for the timing of the second subordinate time slot of the main time slot and the node accesses bus 1 and transmits its frame from steps S34 onward (i.e. S34, S38, S40 and S42).

FIG. 10 illustrates the control procedure of the body-system communication node, which is the low-speed communication node. The flowchart of FIG. 10 superficially is not that different from the flowchart of FIG. 9, with the exception of step S62, and therefore only this step will be described. Specifically, the body-system communication node transmits its data from step S64 onward (i.e. S64, S68, S70, and S72) only when it is determined at step S62 that the present phase is phase 0, which is the only phase in which the body-system communication node is permitted access.

Thus, the present embodiment has the following effects:

(1) A plurality of phases (main time slots) are set in bus-access control, high-speed communication nodes which require higher communication speed are allowed access to the bus in a larger number of phases, and low-speed communication nodes in which low-speed communication suffices are allowed access to the bus in a few phases only. More specifically, the arrangement is such that a low-speed communication node (e.g., the body-system communication node) is granted access only in one phase, whereas high-speed communication nodes (ABS/TRC nodes, etc.) are granted access in two or more phases. Accordingly, the probability that a high-speed communication node will be kept waiting for access to the bus is low. As a result, though the probability that a low-speed communication node will be kept waiting for access is raised, no problem arises because the associated data is generated only infrequently. Thus, in accordance with the transmission control system of this embodiment, it is possible to set a low transmission rate for the overall system, so that a system of low cost can be realized.

(2) A function serving as a master communication node is assigned to the ABS/TRC communication node, which is the high-speed communication node for which data is generated most frequently. This ABS/TRC communication node inserts the channel setting bits in its frame and transmits the frame on the bus, and another communication node which has received this frame acknowledges the channel, namely the phase. Thus, channel management is unified, thereby facilitating control.

Since channel setting management is carried out by a special frame which includes the channel setting bits, as described above, other signal lines for the purpose of channel setting are not required. This also is effective in lowering cost.

(3) Each phase is divided into two periods (the subordinate time slots). In the first of these two periods, only the ABS/TRC communication node, for which data is generated most frequently, is used. This means that the ABS/TRC communication node is no longer kept waiting for access, thus making possible high-speed response in ABS/TRC control, which is control requiring a quick response.

The second subordinate time-slot period in each phase is assigned to communication nodes other than the ABS/TRC communication node. With regard to high-speed communication nodes among these other nodes, in principle one high-speed communication node is assigned to one phase in the phases other than phase 0. As a result, contention between communication nodes in terms of accessing the bus is reduced.

The present invention can be modified in various ways without departing from the scope of the invention.

By way of example, though the communication node which transmits the channel setting bits is described as the ABS/TRC communication node in the foregoing embodiment, this can be carried out by other high-speed communication nodes.

In the event that the ABS/TRC communication node fails, the overall system will fail. To deal with this, the following modification is proposed: Specifically, the channel setting bits are provided in the frame transmitted by the node, e.g., the EGI communication node, which generates data the second most frequently, namely the most frequently after the ABS/TRC communication node. During normal operation, the other communication nodes identify the channel based upon solely the channel setting bits in the frame transmitted by the ABS/TRC communication node. Whether or not a frame has been transmitted by the ABS/TRC communication node can be determined by the ID field. If a failure has occurred in the ABS/TRC communication node, a frame to this effect is transmitted to all communication nodes. Therefore, from next time the other communication nodes identify the channel based solely upon the channel setting bits by which the ID contained in the frame indicates the EGI communication node.

Another modification is possible. In the above embodiment, $\phi_2$, $\phi_1=0$, 0 is assigned to phase 0. Therefore, the acknowledging of phase by each of the communication nodes is performed for the first time by verifying that the ID, which indicates the destination of transmission of the two bit values and of the associated frame, is that of the ABS/TRC communication node. However, this arrangement can be modified as follows: Let the channel setting bits in the frame of the ABS/TRC communication node be n in number, namely $\phi_n$, $\phi_{n-1}$, ..., $\phi_1$. Further, let all of the channel setting bit fields in the frame transmitted by communication nodes other than the ABS/TRC communication node be "0" at all times. Also, let the set number of channels be $2^{n-1}$, where "0" (i.e., n=0) is not assigned to a channel. If such an arrangement is adopted, phase can be discriminated on the communication-node side merely by the combination of channel setting bits.

The present invention is applicable also to a modification in which the channel setting bits are transmitted on a separate signal line.

In addition, the number of main time slots and the number of communication nodes are not limited to those of the foregoing embodiment.

The present invention is not limited to the above embodiments and various changes and modifications can be made within the spirit and scope of the present invention. Therefore, to apprise the public of the scope of the present invention, the following claims are made.

What is claimed is:

1. A multiplex transmission system for a vehicle having a shared multiplex transmission line, and a plurality of communication nodes of a first group and a second group interconnected via the shared multiplex transmission line, frequency of access of the communication nodes of said first group to said shared multiplex transmission line being lower than frequency of access of the communication nodes of said second group to said shared multiplex transmission line, the system comprising:

time-dividing means for dividing a time period during which said plurality of communication nodes are capable of accessing said shared multiplex transmission line into a first plurality of main time slots and a second plurality of main time slots, the time positions of the first plurality of main time slots within a time period and the time positions of the second plurality of main time slots within the time period being fixed, the number of said first plurality of main time slots being smaller than that of said second plurality of main time slots; and assigning means for assigning all communication nodes of said first group to said first plurality of main time slots and all communication nodes of said second group to said second plurality of main time slots.

2. The system according to claim 1, wherein said time-dividing means is provided in a specific single communication node among the communication nodes of said second group.

3. The system according to claim 2, wherein said time-dividing means provided in said specific single communication node has a transmission circuit for transmitting, on said shared multiplex transmission line, a frame possessing identification information which identifies the main time slot; and the communication nodes of said first group have a receiving circuit, serving as said assigning means, for receiving said frame and identifying, from said identification information, a main time slot assigned to the communication node itself.

4. The system according to claim 3, wherein said specific single communication node is a node for a controller which performs torque control of a wheel.

5. The system according to claim 3, wherein each of said main time slots is subdivided into a plurality of subordinate time slots.

6. The system according to claim 5, wherein each of said main time slots is subdivided into a first and second subordinate time slots.

7. The system according to claim 6, wherein said assigning means assigns each first subordinate time slot to said specific single communication node by said assigning means in order that this specific single communication node may access said shared multiplex transmission line, and each second subordinate time slot to the communication nodes of the second group other than said specific single communication node.

8. The system according to claim 1, wherein communication nodes of the second group include first and second vehicle controller nodes, an access frequency of the second vehicle controller node to the shared multiplex transmission line being higher than that of the first vehicle controller node, and wherein said assigning means assigns more number of second main time slots to the first vehicle controller node than the second vehicle controller node, and wherein a number of second main time slots assigned to the first vehicle controller node is larger than a number of first main time slots assigned to every one of the communication nodes of the first group.

9. The system according to claim 3, wherein said identification information is expressed by a binary value.

10. A multiplex transmission system for a vehicle having a shared multiplex transmission line, and a plurality of communication nodes which are divided into first and second groups and are interconnected via said shared multiplex transmission line, frequency of access of the communication nodes of said first group to said shared multiplex transmission line being lower than frequency of access of the communication nodes of said second group to said shared multiplex transmission line, the system comprising:

time-dividing means for dividing a time period during which said plurality of communication nodes are capable of accessing said shared multiplex transmission line into a plurality of main time slots, each time slot capable of containing a message data to be used for vehicle controls and an access identification field for allowing the communication nodes to identity access right to the shared multiplex transmission line; and access right assigning means for loading each access identification field with access identification data so that a greater number of main time slots are assigned to communication nodes access priority of which to said shared multiplex transmission line is higher.

11. A multiplex transmission system for a vehicle having a shared multiplex transmission line, and a plurality of communication nodes of a first group and a second group interconnected via said shared multiplex transmission line, frequency of access of the communication nodes of said first group to said shared multiplex transmission line being lower than frequency of access of the communication nodes of said second group to said shared multiplex transmission line, the system comprising:

time-dividing means for dividing a time period during which said plurality of communication nodes are capable of accessing said shared multiplex transmission line into a plurality of main time slots, and subdividing individual ones of said main time slots into two subordinate time slots each main time slot including an access identification field for allowing the communication nodes to identify access right to the shared multiplex transmission line; and access right assigning means for loading each access identification field with access identification data so that one subordinate time slot of said two subordinate time slots is assigned to said plurality of communication nodes of said first group and the other subordinate time slot of said two subordinate time slots are assigned to the communication nodes of said second group.

12. The system according to claim 11, wherein the communication nodes of said first group perform communication by a contention method in said one subordinate time slot, and tile communication nodes of said second group perform communication by a contention method in said other subordinate time slot.

13. The system according to claim 11, wherein said contention method performs communication by a CSMA/CD method.

14. The system according to claim 11, wherein an order of priority is set for right of access of the communication nodes of said second group to said shared multiplex transmission line.

15. The system according to claim 11, wherein a communication node of said second group is one communication node which develops the necessity to access said shared multiplex transmission line most frequently among said plurality of communication nodes.

* * * * *

UNITED STATES PATENT AND TRADEMARK OFFICE
CERTIFICATE OF CORRECTION

PATENT NO. : 5,343,472

DATED : August 30, 1994

INVENTOR(S) : Michihira, et al.

It is certified that error appears in the above-indentified patent and that said Letters Patent is hereby corrected as shown below:

Col. 6, line 52, change "4 WS" to --4WS--.

Col. 12, line 40, (claim 12), change "tile" to --the--.

Signed and Sealed this

First Day of August, 1995

Attest:

Attesting Officer

BRUCE LEHMAN

Commissioner of Patents and Trademarks